(12) United States Patent
Shimizuya

(10) Patent No.: US 7,758,249 B2
(45) Date of Patent: Jul. 20, 2010

(54) WHEEL SUPPORT ROLLING BEARING UNIT WITH SEAL RING

(75) Inventor: Masayoshi Shimizuya, Kanagawa (JP)

(73) Assignee: NSK Ltd., Tokyo (JP)

( * ) Notice: Subject to any disclaimer, the term of this patent is extended or adjusted under 35 U.S.C. 154(b) by 432 days.

(21) Appl. No.: 11/946,977

(22) Filed: Nov. 29, 2007

(65) Prior Publication Data

US 2008/0124016 A1 May 29, 2008

(30) Foreign Application Priority Data

Nov. 29, 2006 (JP) .............................. 2006-320984

(51) Int. Cl.
*F16C 33/76* (2006.01)
(52) U.S. Cl. ...................... 384/484; 384/544
(58) Field of Classification Search .................. 384/477, 384/484, 486, 544, 589; 277/551, 560
See application file for complete search history.

(56) References Cited

U.S. PATENT DOCUMENTS

| | | | | |
|---|---|---|---|---|
| 3,601,457 A | * | 8/1971 | Helms | ......................... 384/485 |
| 4,325,591 A | * | 4/1982 | Otto | ........................... 384/486 |
| 5,803,617 A | | 9/1998 | Ohnuki et al. | |
| 6,196,727 B1 | | 3/2001 | Kawamura | |

FOREIGN PATENT DOCUMENTS

| | | |
|---|---|---|
| JP | 7-34224 | 6/1995 |
| JP | 9-287619 | 11/1997 |
| JP | 11-210770 | 8/1999 |
| JP | 2003-56577 | 2/2003 |
| JP | 2004-204894 | 7/2004 |
| JP | 2004-205277 | 7/2004 |

* cited by examiner

*Primary Examiner*—Thomas R Hannon
(74) *Attorney, Agent, or Firm*—Katten Muchin Rosenman LLP

(57) ABSTRACT

A structure is realized that can easily identify misassembly of a middle seal lip 18*d* in a structure that obtains a good seal. A middle seal lip 18*d* located between an outside seal lip 17*d* and an inside seal lip 19*d* inclines outwards in an axial direction towards its internal edge, being its tip. This tip makes a sliding contact all around the circumference of a cylindrical surface 21 located on an axial intermediate portion of the hub 2. The sum of a thickness $T_{18}$ in a free state of the middle seal lip 18*d*, and a thickness $\Delta T$ of a portion of a seal member 16*d*, is greater than a width dimension "$(R_{15}-D_2)/2$" in a radial direction of a ring shaped gap 23 located between an internal edge of a metal core 15*d* and the cylindrical surface 21. In a misassembly state, the seal lip 18*d* is strongly clamped between the internal edge of the metal core 15*d* and the cylindrical surface 21, resulting in great friction between the middle seal lip 18*d* and the cylindrical surface 21, so that the misassembly state can be identified easily.

1 Claim, 5 Drawing Sheets

WHEEL SUPPORT ROLLING BEARING UNIT WITH SEAL RING

BACKGROUND OF THE INVENTION

1. Field of the Invention

The present invention relates to improvements to a wheel support rolling bearing unit with seal ring for supporting the wheel of an automobile on a suspension device. To be specific, it realizes a structure in which, in the case where one or more seal lips are assembled in the opposite state from the correct direction (misassembled), the fact can be identified easily.

2. Description of Related Art

Heretofore, as is disclosed in Patent Documents 1 to 6 for example, a range of structures is known for a wheel support rolling bearing unit with seal ring for rotatably supporting the wheel of an automobile on a suspension device. FIG. 2 shows one example of a conventionally-known structure, which is disclosed in Patent Document 2. The wheel support rolling bearing unit with seal ring comprises an outer ring 1, a hub 2, a plurality of rolling elements 3, a seal ring 4, and a cap 5. The outer ring 1 has an external flange shaped attachment portion 6 on its outer peripheral surface for supporting and fixing the outer ring 1 on the suspension device, and a double row of outer ring raceways 7 on its inner peripheral surface. Furthermore, the hub 2 is formed by a hub body 8 and an inner ring 9, joined together, and fastened by a nut 10. A flange 11 for supporting and fixing a wheel is provided on a portion towards the axial outside end of the outer peripheral surface of the hub 2, which is the portion protruding from the outer ring 1 outwardly in the axial direction, and a double row of inner ring raceways 12 are provided on portions in the center and towards the axial inside end. (The outside relative to the axial direction means the outer side in the widthwise direction when assembled on an automobile, which is the left side in the figures. Conversely, the inside relative to the axial direction means the side towards the center in the widthwise direction, which is the right side of the figures. This terminology is also used in the present specification and the claims as a whole.) In recent years, a structure has also been widely known and implemented in which the hub body and inner rings are combined by a crimped portion, which is formed by plastically deforming radially outwards a cylindrical portion formed on the axial inside end portion of the hub body. In either case, a plurality of pieces of the abovementioned rolling elements 3 are provided for each of the two rows between the two outer ring raceways 7 and the two inner ring raceways 12 in a state where they are retained by respective cages 13. In the example in the figure, balls are used as the rolling elements 3. However, in the case of a wheel support rolling bearing unit with seal ring for heavier automobiles, tapered rollers may be used as the rolling elements.

Furthermore, the seal ring 4 is provided between the inner peripheral surface of the outer end of the outer ring 1 and the outer peripheral surface of the intermediate part of the hub 2, and it closes the outside opening of an inner space 14, which is between the inner peripheral surface of the outer ring 1 and the outer peripheral surface of the hub 2, in which the rolling elements 3 are provided. Moreover, the cap 5 closes the inside opening of the outer ring 1. By means of the cap 5 and the seal ring 4, foreign substances such as dust, rain water and the like are prevented from entering the inner space 14, and grease in the inner space 14 is prevented from leaking to the exterior.

In order to sufficiently prevent foreign substances from entering the inner space 14, and grease filling up the inner space 14 from leaking out, it is necessary to ensure the sealing performance of the seal ring 4. For a seal ring considered for this purpose, Patent Document 1 discloses a seal ring 4a as shown in FIG. 3, and Patent Document 2 discloses a seal ring 4b as shown in FIG. 4. The seal rings 4a and 4b are formed by annular shaped metal cores 15a and 15b and annular seal members 16a and 16b, respectively. Here, the metal cores 15a and 15b are made from metal plates, and are internally fixed to the outside end of the outer ring 1. Furthermore, the seal members 16a and 16b are made of an elastic material such as an elastomer including rubber or the like, and are fastened to the metal cores 15a and 15b by baking or the like. Moreover, each of the seal members 16a and 16b has three seal lips, 17a, 18a and 19a, or 17b, 18b and 19b. The seal lips 17a, 18a, 17b and 18b among the seal lips 17a, 18a, 19a, 17b, 18b and 19b, which are on the farthest side (outside) from the inner space 14, and the middle, incline outwards in the radial direction towards their tips. Each of the tips makes a sliding contact all around the circumference of the axial inside surface of the flange 11, or a curved surface portion 20, which is located on the continuous portion between the axial inside surface of the flange 11 and the outer peripheral surface of the hub 2. Moreover, the seal lips 19a and 19b on the closest side (inside) to the inner space 14 incline inwards in the axial direction towards the internal edge, being their tips, and these tips make a sliding contact all around the circumference of a cylindrical outer peripheral surface (cylindrical surface 21) located on the axial intermediate portion of the hub 2.

Among the seal lips 17a, 18a, 19a, 17b, 18b and 19b provided in the seal rings 4a and 4b as described above, the seal lips 17a, 18a, 17b and 18b on the outside and in the middle mainly contribute to preventing foreign substances from entering the inner space 14 from the outer space. Conversely, the seal lips 19a and 19b on the inside mainly contribute to preventing grease in the inner space 14 from leaking outside. Since the wheel support rolling bearing unit with seal ring shown in FIG. 2 has a structure for undriven wheels (front wheels of an FR vehicle or an MR vehicle, rear wheels of an FF vehicle), the inside opening of the outer ring 1 is closed by the cap 5. Conversely, in the case of a wheel support rolling bearing unit with seal ring for driving wheels (rear wheels of an FR vehicle or an MR vehicle, front wheels of an FF vehicle, all wheels of a 4WD vehicle), the inside opening of the inner space is closed by a seal ring such as a combinational seal ring or the like.

Whichever wheel support rolling bearing unit with seal ring for undriven wheels or driving wheels is used, the outside opening of the inner space 14 is usually closed by seal rings 4a and 4b, which are provided with three seal lips 17a, 18a and 19a, or 17b, 18b and 19b. In such seal rings 4a and 4b, in the case where the middle seal lips 18a and 18b make sliding contact with the axial inside surface of the flange 11 or the curved surface portion 20 as shown in FIGS. 3 and 4, it is not always a favorable structure from the aspect of ensuring sealing performance. That is, the axial inside surface and the curved surface portion 20 are likely to be displaced by the moment applied to the hub 2 from the wheels during traveling. In the case where they are displaced, the adherence between the tips of the middle seal lips 18a and 18b and the axial inside surface or the curved surface portion 20 deteriorates, and thus the sealing performance of the seal lips 18a and 18b is lowered. In the case where such a circumstance is considered, as in the structures disclosed in Patent Documents 5 and 6, it is also desirable for the middle seal lips to make sliding contact with the cylindrical outer peripheral surface located on the axial intermediate portion of the hub 2.

FIG. 5 shows a seal ring 4c in which such a circumstance is considered. Among three seal lips 17c, 18c and 19c of a seal member 16c constituting the seal ring 4c together with a metal core 15c, the seal lip 17c on the outside and the seal lip 19c on the inside make sliding contact all around the circumference of the axial inside surface of the flange 11 and the cylindrical surface 21 located on the outer peripheral surface of the axial intermediate portion of the hub 2, respectively, similarly to the structures shown in FIGS. 3 and 4. In particular, in the case of the structure shown in FIG. 5, the middle seal lip 18c is inclined in a direction outwards in the axial direction towards the internal edge, being its tip, and this tip makes a sliding contact all around the circumference of the cylindrical surface 21. In the case of the structure shown in FIG. 5 also, similarly to the structures shown in FIGS. 3 and 4, the seal lips 17c and 18c on the outside and in the middle mainly contribute to preventing foreign substances from entering the inner space 14 from the outer space, and the seal lip 19c on the inner side mainly contributes to preventing grease in the inner space 14 from leaking out. The sliding contact condition between the tips of the seal lips 18c and 19c, in the middle and on the inside, and the cylindrical surface 21 can be made stable regardless of the moment applied to the hub 2 during traveling. Therefore, the structure shown in FIG. 5 enables the performance of preventing foreign substances from entering the inner space 14 to be improved in comparison with the structures shown in FIGS. 3 and 4.

However, in the case of the structure shown in FIG. 5, there is a possibility that the following problem occurs due to the shape of the middle seal lip 18c. That is, since it is necessary for the tip of the seal lip 18c to make contact with the cylindrical surface 21 in a state in which the required contact pressure is ensured all around the circumference, the inner diameter of the seal lip 18c in a free state is slightly smaller than the diameter (outer diameter) of the cylindrical surface 21. When assembling the wheel support rolling bearing unit with seal ring, the seal ring 4c, which has been internally secured to the axial outside end of the outer ring 1 in advance, is fitted onto the intermediate portion of the hub 2. At this time, the internal edge of the middle seal lip 18c is guided by a sloping guide surface 22 provided between the axial outside inner ring raceway 12 provided on the outer peripheral surface of the intermediate portion of the hub 2, and the cylindrical surface 21, and slips onto the cylindrical surface 21 while its inner diameter is expanded elastically.

The assembly operation of the wheel support rolling bearing unit with seal ring as described above is performed with the outer ring 1 and the hub 2 aligned. However, if the central axes of the two members 1 and 2 are shifted even slightly for some reason, the overlap of the middle seal lip 18c and the guide inclined surface 22 becomes too large. In this case, as shown by the chain lines in FIG. 5, there is a possibility of the seal lip 18c being assembled while being elastically deformed (turned back) inwards in the axial direction towards its tip, which is the opposite of the correct state. In the case where the middle seal lip 18c is assembled reversed in this manner, not only does the sealing performance by the seal lip 18c deteriorate, but also the friction between the tip of the seal lip 18c and the cylindrical surface 21 increases, and hence the dynamic torque of the wheel support rolling bearing unit with seal ring increases. The deterioration of the sealing performance becomes the cause of a drop in the durability of the wheel support rolling bearing unit with seal ring due to foreign substances entering the inner space 14. Furthermore, the increase in the dynamic torque becomes the cause of a drop in acceleration and fuel consumption performance due to the increase in the resistance against the rotation of the wheel.

If misassembly of the middle seal lip 18c, which is the cause of such a failure occurring, can be identified easily, it is possible to prevent the failure occurring by disassembling and reassembling the concerned rolling bearing unit with seal ring. However, the middle seal lip 18c cannot be observed visually from outside after the rolling bearing unit with seal ring is assembled. Moreover, since the increase of the dynamic torque is small, it is difficult to detect the misassembly by measuring the dynamic torque.

[Patent Document 1] Japanese Utility Model Application Publication No. H7-34224

[Patent Document 2] Japanese Patent Application Publication No. H9-287619

[Patent Document 3] Japanese Patent Application Publication No. H11-210770

[Patent Document 4] Japanese Patent Application Publication No. 2003-56577

[Patent Document 5] Japanese Patent Application Publication No. 2004-204894

[Patent Document 6] Japanese Patent Application Publication No. 2004-205277

SUMMARY OF THE INVENTION

Problems to be Solved by the Invention

The present invention takes the above-described circumstances into consideration, with an object of realizing a wheel support rolling bearing unit with seal ring, in which misassembly of a middle seal lip can be identified easily.

Means for Solving the Problems

A wheel support rolling bearing unit with seal ring of the present invention comprises an outer ring, a hub, a plurality of rolling elements, and a seal ring.

Here, the outer ring is provided with a double row of outer ring raceways on its inner peripheral surface.

Furthermore, the hub is provided with a double row of inner ring raceways on its outer peripheral surface.

Moreover, a plurality of rolling elements are provided for each of the rows between the inner ring raceways and the outer ring raceways.

Furthermore, the seal ring is provided between an axial outside end of the outer ring and an outer peripheral surface of an intermediate portion of the hub, and it closes an axial outside opening of an inner space in which the rolling elements are provided.

Moreover, the seal ring is provided with a metal core fixed to an axial outside end of the outer ring, and three seal lips, each of which is made from an elastic material, and has its base end portion supported by the metal core. Of the seal lips, a seal lip on an outside, which is the farthest side from the inner space, inclines outwards in a radial direction towards its tip, and this tip makes a sliding contact all around the circumference of an axial inside surface of a flange provided on an outer peripheral surface of a portion towards the axial outside end of the hub, which is a portion protruding outwards in the axial direction from the outer ring.

Furthermore, a seal lip on an inside, which is the closest side to the inner space, inclines inwards in the axial direction towards its internal edge, being its tip, and this tip makes a sliding contact all around the circumference of the cylindrical outer peripheral surface located on the axial intermediate portion of the hub.

Moreover, a middle seal lip located between the outside seal lip and the inside seal lip inclines outwards in the axial direction towards its internal edge, being its tip, and this tip makes a sliding contact all around the circumference of a cylindrical outer peripheral surface located on the axial intermediate portion of the hub.

In particular, in the case of a wheel support rolling bearing unit with seal ring according to the present invention, a sum of a thickness in a free state of a portion of the middle seal lip, which is located on the inner diameter side of the metal core in the case where this middle seal lip is inserted on the inner diameter side of the metal core by bending it against its elasticity, and a thickness in a free state of the elastic material located further inner side in the radial direction than an internal edge of the metal core, is greater than a width dimension in the radial direction of a ring shaped gap located between the internal edge of the metal core and the outer peripheral surface of the intermediate portion of the hub.

EFFECTS OF THE INVENTION

Using a wheel support rolling bearing unit with seal ring of the present invention constructed as described above, it is possible to identify misassembly of the middle seal lip easily.

That is to say, in the case of the wheel support rolling bearing unit with seal ring according to the present invention, if the middle seal lip is turned back during assembly, the middle seal lip enters the ring shaped gap between the internal edge of the metal core and the outer peripheral surface of the intermediate portion of the hub. The width dimension of this ring shaped gap in the radial direction is smaller than the thickness in a free state of the portion of the middle seal lip that enters the gap. Therefore, in a state in which the middle seal lip enters the ring shaped gap accompanying misassembly, the portion of the middle seal lip is compressed elastically between the internal edge of the metal core and the outer peripheral surface of the intermediate portion of the hub.

Therefore, the pressure of the contact surface of the outer peripheral surface of the intermediate portion of the hub and the middle seal lip increases, so that great friction acts between the contact surface of the outer peripheral surface of the intermediate portion of the hub and the middle seal lip. In this state, it is evident that the resistance (dynamic torque of the wheel support rolling bearing unit with seal ring) of the hub against rotation becomes great compared with the case where the middle seal lip is assembled in a correct state. Therefore, by rotating the hub against the outer ring after assembly, and measuring the torque required at that time, it is possible to determine easily and reliably whether or not the middle seal lip is assembled in a correct state.

DETAILED DESCRIPTION OF THE INVENTION

Figure 1:
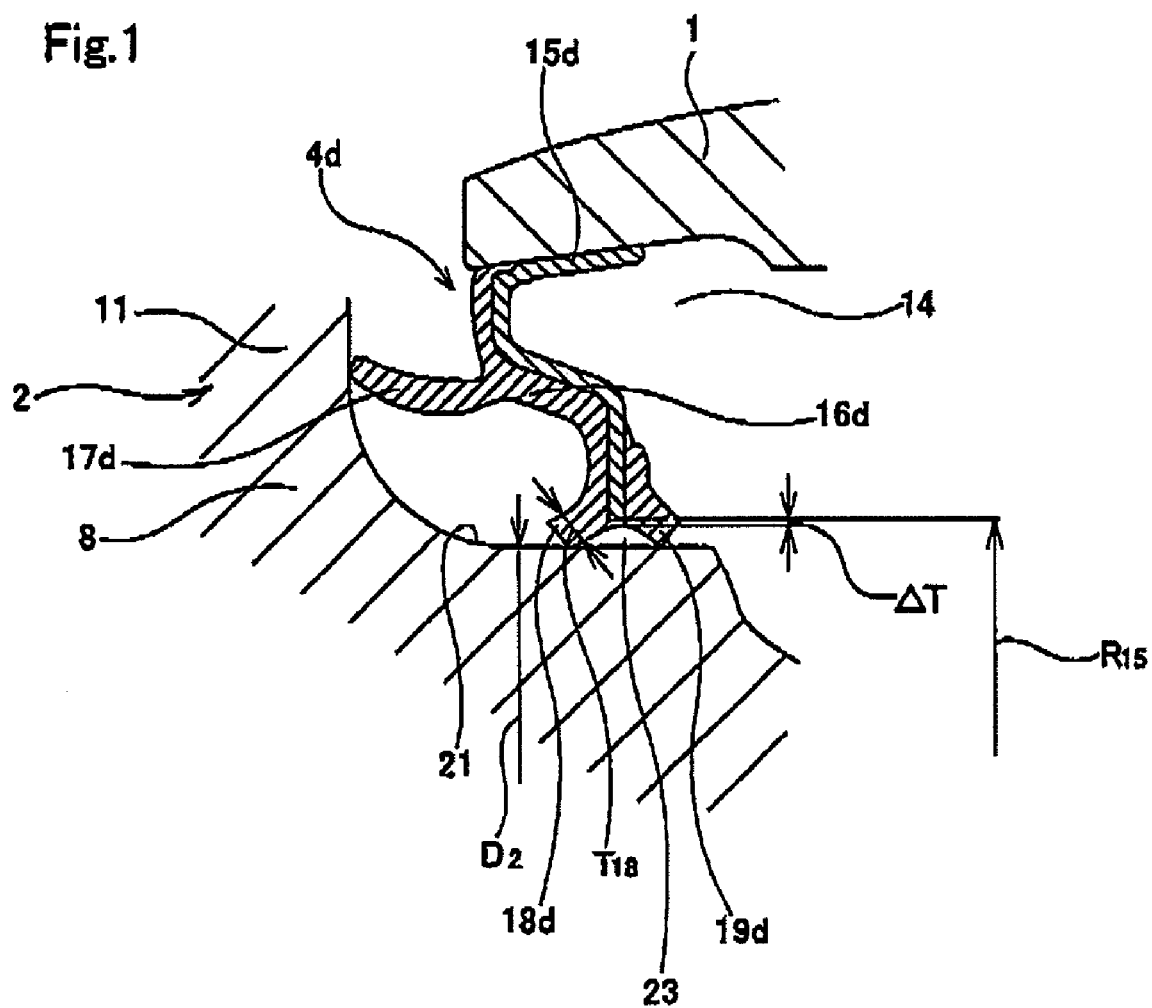
FIG. 1 is an enlarged cross-sectional view corresponding to part A of FIG. 2, showing an embodiment of the present invention.
Figure 2:
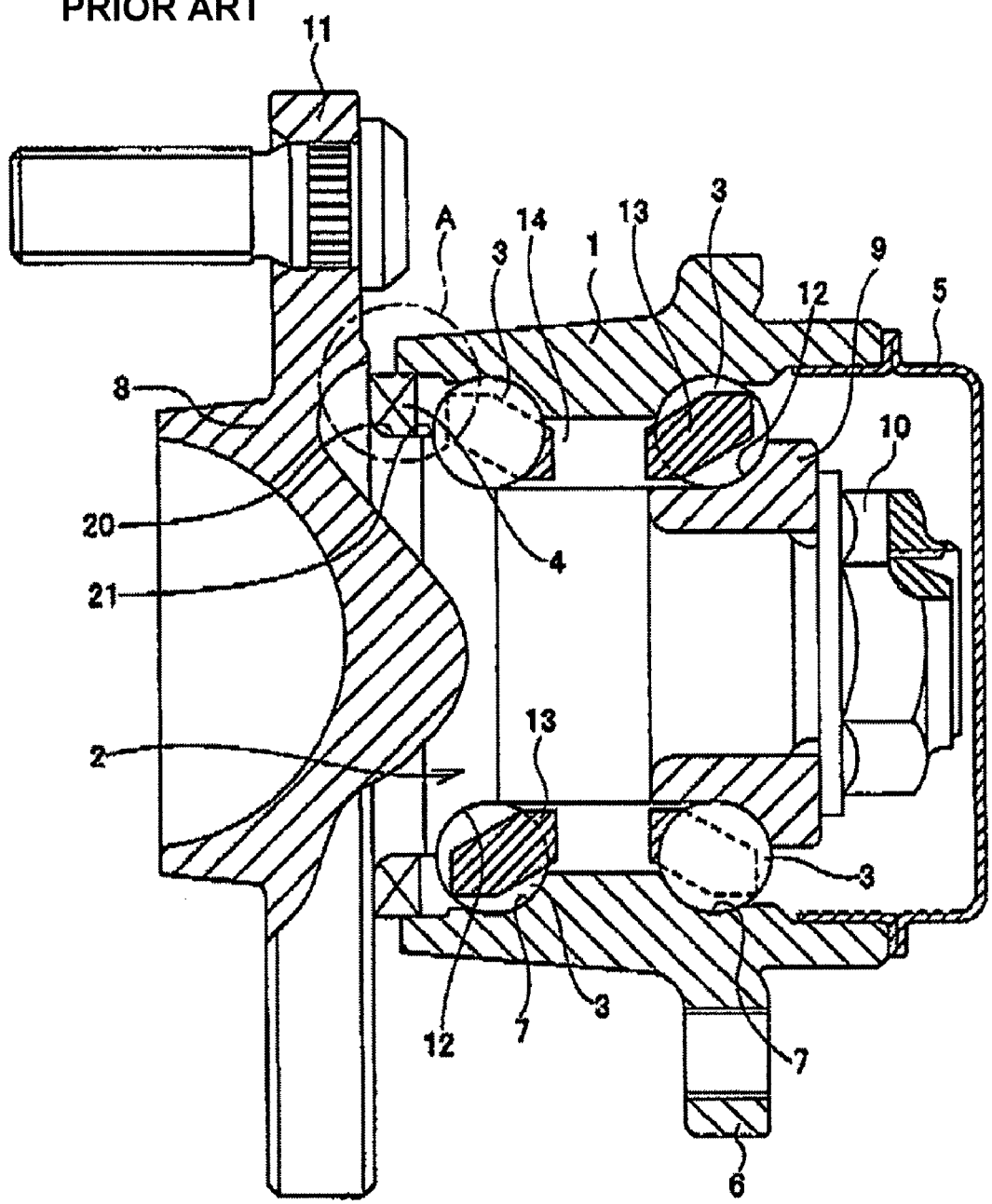
FIG. 2 is a cross-sectional view showing one example of a wheel support rolling bearing unit with seal ring, which is an object of the present invention.
Figure 3:
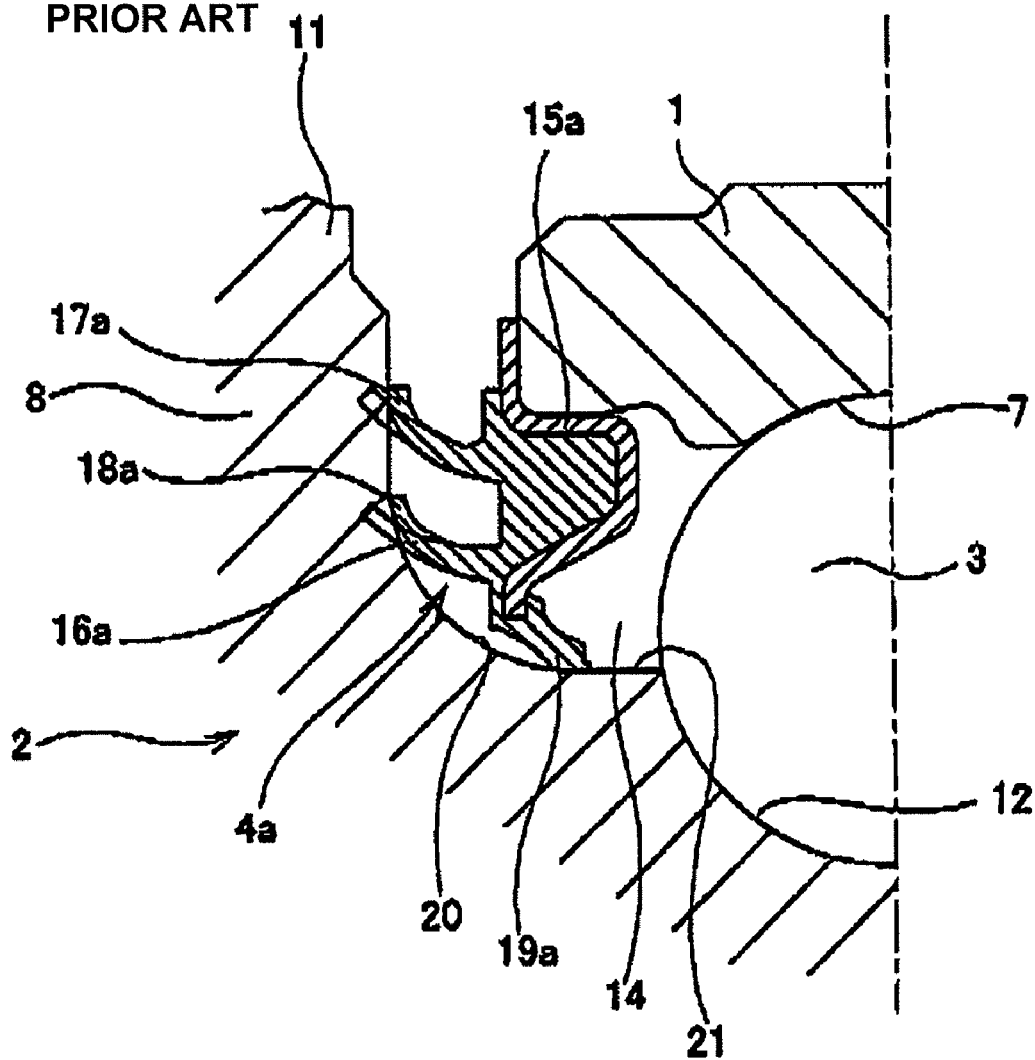
FIG. 3 is an enlarged view corresponding to part A of FIG. 2, showing a seal ring of a first example of a conventional structure.
Figure 4:
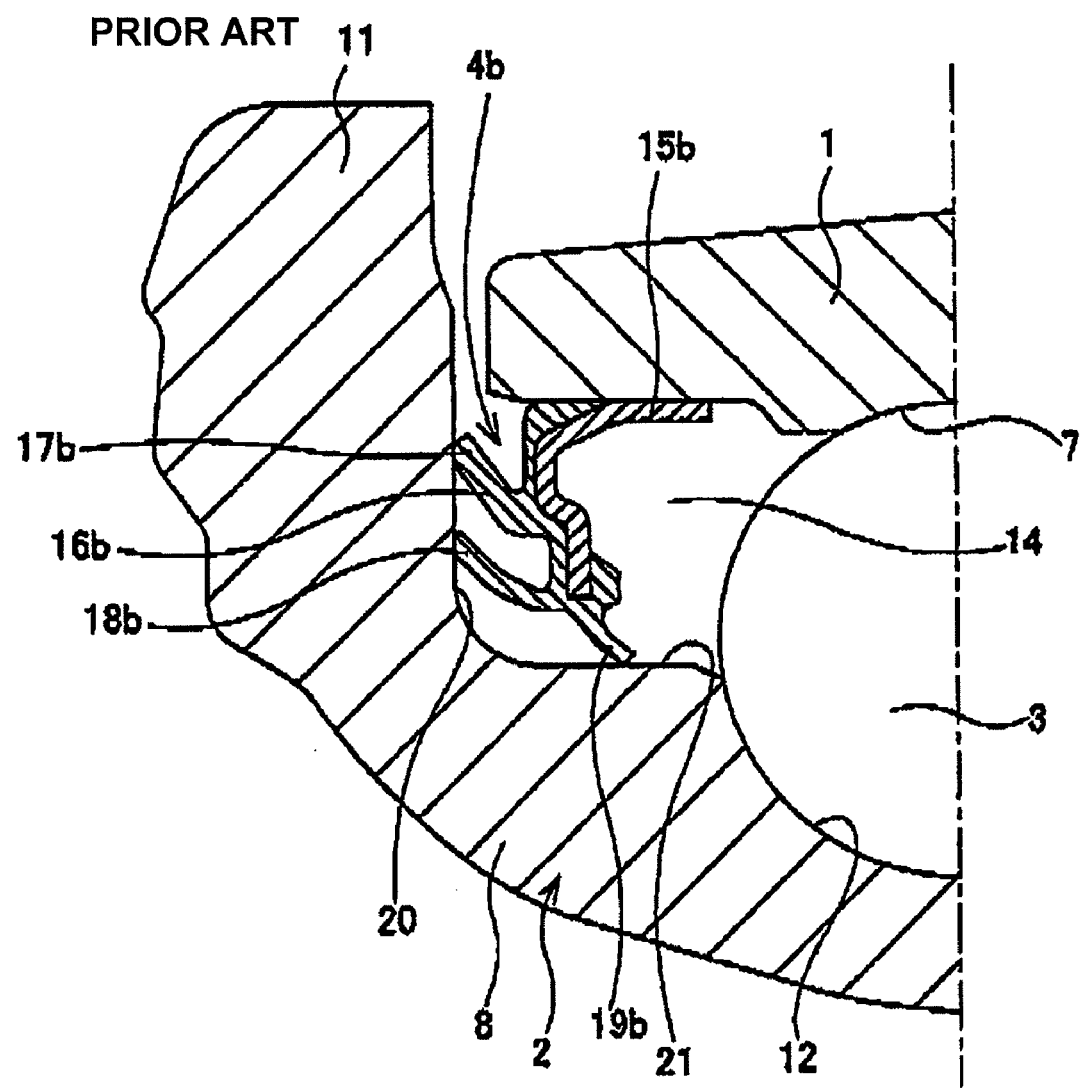
FIG. 4 is a view similar to FIG. 3, showing a seal ring of a second example of a conventional structure.

FIG. 1 shows an embodiment of the present invention. The characteristic of the present example is that among three seal lips $17d$, $18d$ and $19d$ of a seal member $16d$ constituting a seal ring $4d$, together with a metal core $15d$, a thickness dimension $T_{18}$ of the middle seal lip $18d$ is controlled by a relationship between the inner diameter $R_{15}$ of the metal core $15d$ and an outer diameter $D_2$ of a hub 2 (a cylindrical surface 21 thereof). In other respects, the construction and operation of the overall wheel support rolling bearing unit with seal ring are similar to FIG. 2, and the inclination direction of the three seal lips $17d$, $18d$ and $19d$, and the sliding contact positions of each of the tips, are similar to the structure shown in FIG. 5. Therefore, the descriptions and illustrations associated with similar parts are omitted, or simplified. Hereunder is a description concentrating on the characteristic parts of the present example.

Figure 5:
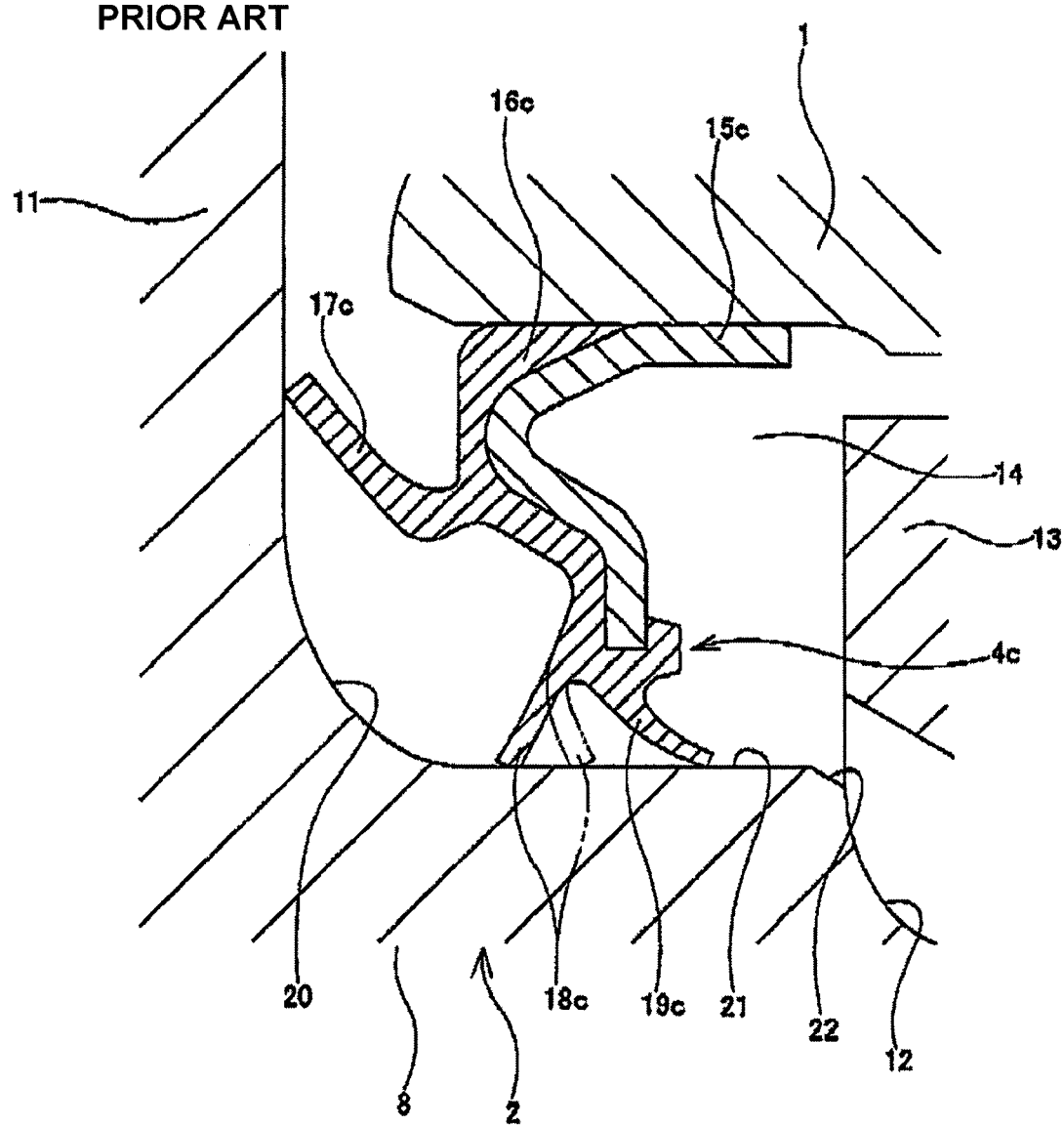
FIG. 5 is a view similar to FIG. 3, showing a seal ring of a third example of a conventional structure.

In the case of the present example, the inner diameter $R_{15}$ of the metal core $15d$ is smaller than the inner diameter of the metal core $15c$ installed in the structure described in FIG. 5, and the internal edge of the metal core $15d$ is close to, and faces, a cylindrical surface 21 provided on the outer peripheral surface of the axial intermediate portion of the hub 2. Since the outer diameter of the cylindrical surface 21 is $D_2$, and the seal ring $4d$ and the hub 2 are positioned concentrically with each other, a ring shaped gap 23, whose width dimension in the diameter direction is "$(R_{15}-D_2)/2$", is formed all around the circumference between the internal edge of the metal core $15d$ and the cylindrical surface 21. Furthermore, the sum of the thickness dimension $T_{18}$ of a intermediate portion of the middle seal lip $18d$, which is located on the inner diameter side of the metal core $15d$ in the case where this seal lip $18d$ is inserted on the inner diameter side of the metal core $15d$ by bending it inward (to the right in FIG. 1) in the axial direction against its elasticity, and the thickness $\Delta T$ of a portion of the seal member $16d$, which is located further inner side in the radial direction than the internal edge of the metal core $15d$, is greater than the width dimension of the ring shaped gap 23 $\{T_{18}+\Delta T>(R_{15}-D_2)/2\}$.

Using the wheel support rolling bearing unit with seal ring of the present example constructed as described above, it is possible to identify misassembly of the middle seal lip easily. That is, in the case of the wheel support rolling bearing unit with seal ring of the present example, if the seal lip $18d$ is turned back during assembly (the inclination direction becomes opposite to the state in FIG. 1) due to excessive overlap of the tip of the middle seal lip $18d$ and the outer peripheral surface of the hub 2, or the like, the seal lip $18d$ enters the ring shaped gap 23 between the internal edge of the metal core $15d$ and the cylindrical surface 21, which is the outer peripheral surface of the intermediate portion of the hub 2. The width "$(R_{15}-D_2)/2$" of the ring shaped gap 23 in the radial direction is smaller than the sum of the thickness $T_{18}$ in a free state of the intermediate portion of the seal lip $18d$, which enters the ring shaped gap 23, and the thickness $\Delta T$ of a portion of the seal member $16d$. Therefore, in a state in which the seal lip $18d$ enters the ring shaped gap 23 accompanying misassembly, a portion of the seal lip $18d$ is compressed elastically between the internal edge of the metal core $15d$ and the cylindrical surface 21.

As a result, the pressure of the contact surface of the cylindrical surface 21 and the seal lip $18d$ increases, so that great friction acts between the contact surface of the cylindrical surface 21 and the seal lip $18d$. In this state, it is evident that the resistance (dynamic torque of the wheel support rolling bearing unit with seal ring) of the hub 2 against rotation becomes great compared with the case where the seal lip $18d$ is assembled in a correct state. Therefore, by rotating the hub 2 against the outer ring 1, and measuring the torque required at that time, it is possible to determine easily and reliably whether or not the seal lip $18d$ is assembled in a correct state.

What is claimed is:

1. A wheel support rolling bearing unit with seal ring comprising:

an outer ring provided with a double row of outer ring raceways on its inner peripheral surface, a hub provided with a double row of inner ring raceways on its outer peripheral surface, a plurality of rolling elements provided for each of the rows between the outer ring raceways and the inner ring raceways, and a seal ring provided between an axial outside end of the outer ring and an outer peripheral surface of an intermediate portion of the hub, that closes an axial outside opening of an inner space in which the rolling elements are provided, the seal ring being provided with a metal core fixed to an axial outside end of the outer ring, and three seal lips, each of which is made from an elastic material, and has its base end portion supported by the metal core, of the seal lips, a seal lip on an outside, which is the farthest side from the inner space, inclining outwards in a radial direction towards its tip, and this tip making a sliding contact all around the circumference of an axial inside surface of a flange provided on an outer peripheral surface of a portion towards the axial outside end of the hub, which is a portion protruding outwards in the axial direction from the outer ring, a seal lip on an inside, which is the closest side to the inner space, inclining inwards in the axial direction towards its internal edge, being its tip, and this tip making a sliding contact all around the circumference of the cylindrical outer peripheral surface located on the axial intermediate portion of the hub, and a middle seal lip located between the outside seal lip and the inside seal lip inclining outwards in the axial direction towards its internal edge, being its tip, and this tip making a sliding contact all around the circumference of a cylindrical outer peripheral surface located on the axial intermediate portion of the hub, and a sum of a thickness in a free state of a portion of the middle seal lip, which is located on the inner diameter side of the metal core in the case where this middle seal lip is inserted on the inner diameter side of the metal core by bending it against its elasticity, and a thickness in a free state of the elastic material located further inner side in the radial direction than an internal edge of the metal core, being greater than a width dimension in the radial direction of a ring shaped gap located between the internal edge of the metal core and the outer peripheral surface of the intermediate portion of the hub.

* * * * *